(12) United States Patent
Kusafuka et al.

(10) Patent No.: US 12,382,010 B2
(45) Date of Patent: Aug. 5, 2025

(54) DETECTION DEVICE AND IMAGE DISPLAY SYSTEM

(71) Applicant: KYOCERA Corporation, Kyoto (JP)

(72) Inventors: Kaoru Kusafuka, Tokyo (JP); Akinori Satou, Otsu (JP); Ayuki Hayashishita, Yasu (JP)

(73) Assignee: KYOCERA Corporation, Kyoto (JP)

(*) Notice: Subject to any disclaimer, the term of this patent is extended or adjusted under 35 U.S.C. 154(b) by 54 days.

(21) Appl. No.: 18/034,347

(22) PCT Filed: Oct. 19, 2021

(86) PCT No.: PCT/JP2021/038574
§ 371 (c)(1),
(2) Date: Apr. 27, 2023

(87) PCT Pub. No.: WO2022/091864
PCT Pub. Date: May 5, 2022

(65) Prior Publication Data
US 2023/0388479 A1    Nov. 30, 2023

(30) Foreign Application Priority Data
Oct. 30, 2020   (JP) ................................ 2020-182946

(51) Int. Cl.
*H04N 13/383* (2018.01)
*G06T 7/73* (2017.01)
(Continued)

(52) U.S. Cl.
CPC .............. *H04N 13/383* (2018.05); *G06T 7/74* (2017.01); *G06V 10/147* (2022.01);
(Continued)

(58) Field of Classification Search
CPC .... H04N 13/366; H04N 13/383; H04N 13/31; H04N 13/312; G06V 10/147;
(Continued)

(56) References Cited

U.S. PATENT DOCUMENTS

| 6,970,290 B1 | 11/2005 | Mashitani et al. | |
| 8,599,200 B2 * | 12/2013 | Yokote | H04N 13/359 348/54 |
| 2002/0101506 A1 * | 8/2002 | Suzuki | H04N 13/327 348/E13.05 |
| 2003/0012425 A1 * | 1/2003 | Suzuki | G02B 27/0093 348/E13.05 |

(Continued)

FOREIGN PATENT DOCUMENTS

| JP | 2001-166259 A | 6/2001 |
| JP | 2001-195582 A | 7/2001 |
| JP | 2014-54486 A | 3/2014 |

*Primary Examiner* — Tsion B Owens
(74) *Attorney, Agent, or Firm* — Procopio, Cory, Hargreaves & Savitch LLP

(57) ABSTRACT

A detection device includes an input device and a detector. The input device in the detection device receives input of image information output from a camera. The detector performs a detection process to detect positions of eyes of a user. The detector performs, as the detection process, a first process to detect first positions of the eyes based on the image information by template matching, and a second process to detect a position of a face based on the image information by template matching and detect second positions of the eyes based on the detected position of the face.

10 Claims, 12 Drawing Sheets

(51) Int. Cl.
*G06V 10/147* (2022.01)
*G06V 40/16* (2022.01)
*H04N 13/312* (2018.01)

(52) U.S. Cl.
CPC ......... *G06V 40/166* (2022.01); *H04N 13/312* (2018.05); *G06T 2207/30201* (2013.01)

(58) Field of Classification Search
CPC .. G06V 40/165; G06V 10/751; G06V 40/166; G06V 40/18; G06V 40/171; G06V 10/25; G03B 17/54; G03B 35/24; G06T 7/74; G06T 2207/30201; G06T 2207/10048; G06T 2207/30041
See application file for complete search history.

(56) References Cited

U.S. PATENT DOCUMENTS

| | | | | |
|---|---|---|---|---|
| 2008/0285791 | A1* | 11/2008 | Suzuki | G06V 40/165 |
| | | | | 382/100 |
| 2011/0090355 | A1* | 4/2011 | Muramatsu | H04N 23/611 |
| | | | | 348/222.1 |
| 2013/0030811 | A1* | 1/2013 | Olleon | G06F 3/011 |
| | | | | 348/148 |
| 2014/0078282 | A1* | 3/2014 | Aoki | G06V 40/161 |
| | | | | 348/78 |
| 2015/0309569 | A1* | 10/2015 | Kohlhoff | G06V 40/193 |
| | | | | 382/103 |
| 2018/0011313 | A1* | 1/2018 | Nahman | G02B 27/01 |
| 2019/0318151 | A1* | 10/2019 | Shichijo | G06V 10/761 |
| 2020/0175258 | A1* | 6/2020 | Kang | G06V 40/166 |
| 2021/0397859 | A1* | 12/2021 | Arora | G06V 40/171 |
| 2022/0270407 | A1* | 8/2022 | Ohno | G06V 40/161 |

* cited by examiner

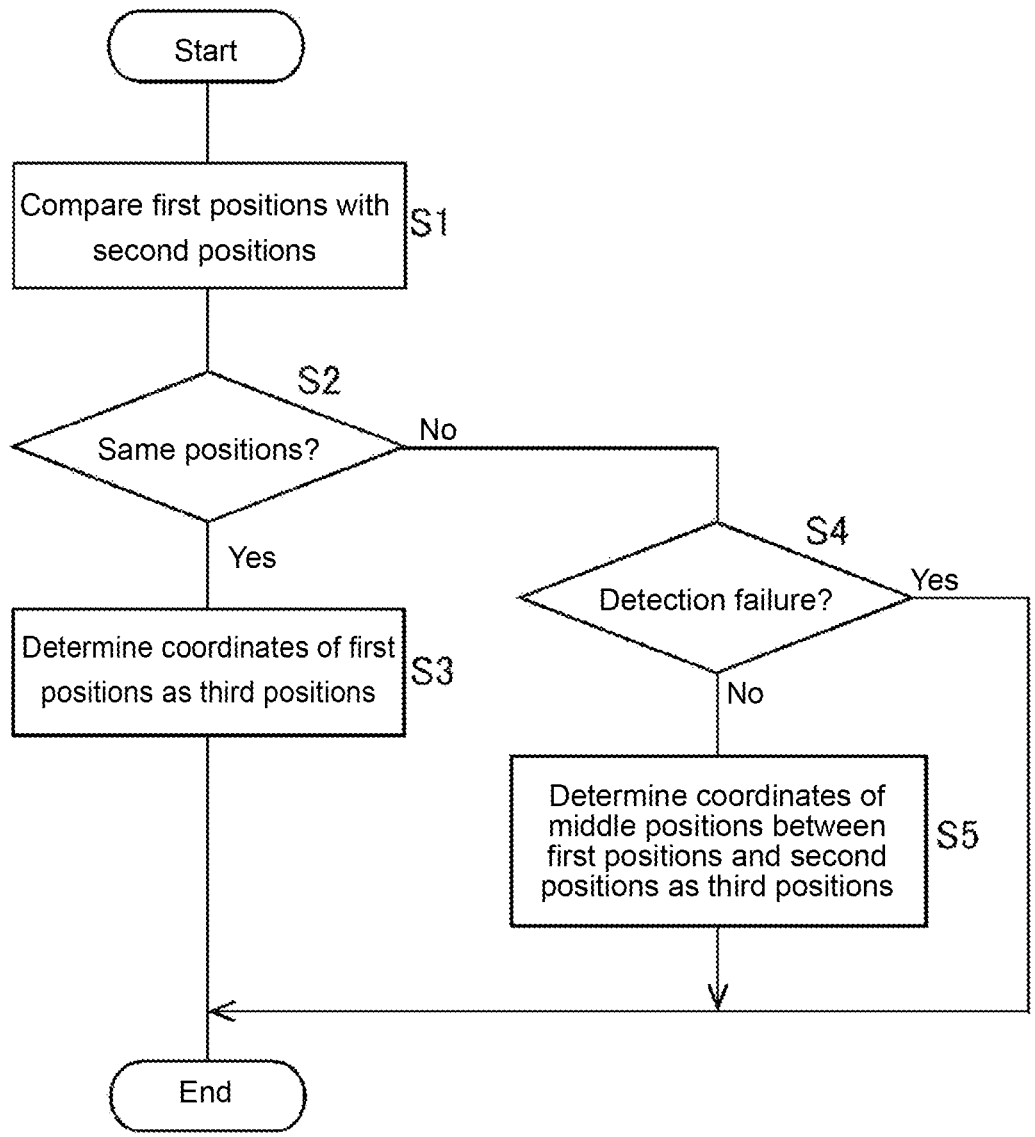

DETECTION DEVICE AND IMAGE DISPLAY SYSTEM

TECHNICAL FIELD

The present disclosure relates to a detection device and an image display system.

BACKGROUND OF INVENTION

Known detection of the positions of the eyes of a user includes obtaining positional data indicating the positions of the pupils using an image of the eyes of the user captured with a camera. For example, a three-dimensional (3D) display device displays an image on a display to allow the left and right eyes of the user to view the corresponding images based on the positions of the pupils indicated by the positional data (e.g., Patent Literature 1).

CITATION LIST

Patent Literature

Patent Literature 1: Japanese Unexamined Patent Application Publication No. 2001-166259

SUMMARY

In one embodiment of the present disclosure, a detection device includes an input device and a controller. The input device receives input of image information. The controller performs a detection process to detect positions of eyes of a user. The controller performs, as the detection process, a first process and a second process. In the first process, the controller detects first positions of the eyes based on the input image information by template matching using a first template image. In the second process, the controller detects a position of a face based on the input image information by template matching using a second template image different from the first template image and detects second positions of the eyes based on the detected position of the face.

In one embodiment of the present disclosure, an image display system includes a display, a barrier, a camera, an input device, a detector, and a display controller. The display displays a parallax image projected toward two eyes of a user through an optical system. The barrier defines a traveling direction of image light of the parallax image to generate parallax between the two eyes. The camera captures an image of a face of the user. The input device receives input of image information output from the camera. The detector performs a detection process to detect positions of the two eyes of the user. The display controller generates a parallax image corresponding to the positions of the two eyes of the user detected by the detector and controls the display. The detector performs, as the detection process, a first process and a second process. In the first process, the detector detects first positions of the two eyes based on the input image information by template matching using a first template image. In the second process, the detector detects a position of the face based on the input image information by template matching using a second template image different from the first template image and detects second positions of the two eyes based on the detected position of the face.

BRIEF DESCRIPTION OF THE DRAWINGS

FIG. 7C is a flowchart of a third process.

DESCRIPTION OF EMBODIMENTS

One or more embodiments of the present disclosure will now be described in detail with reference to the schematic drawings. The drawings used herein are schematic and are not drawn to scale relative to the actual size of each component.

Figure 1:
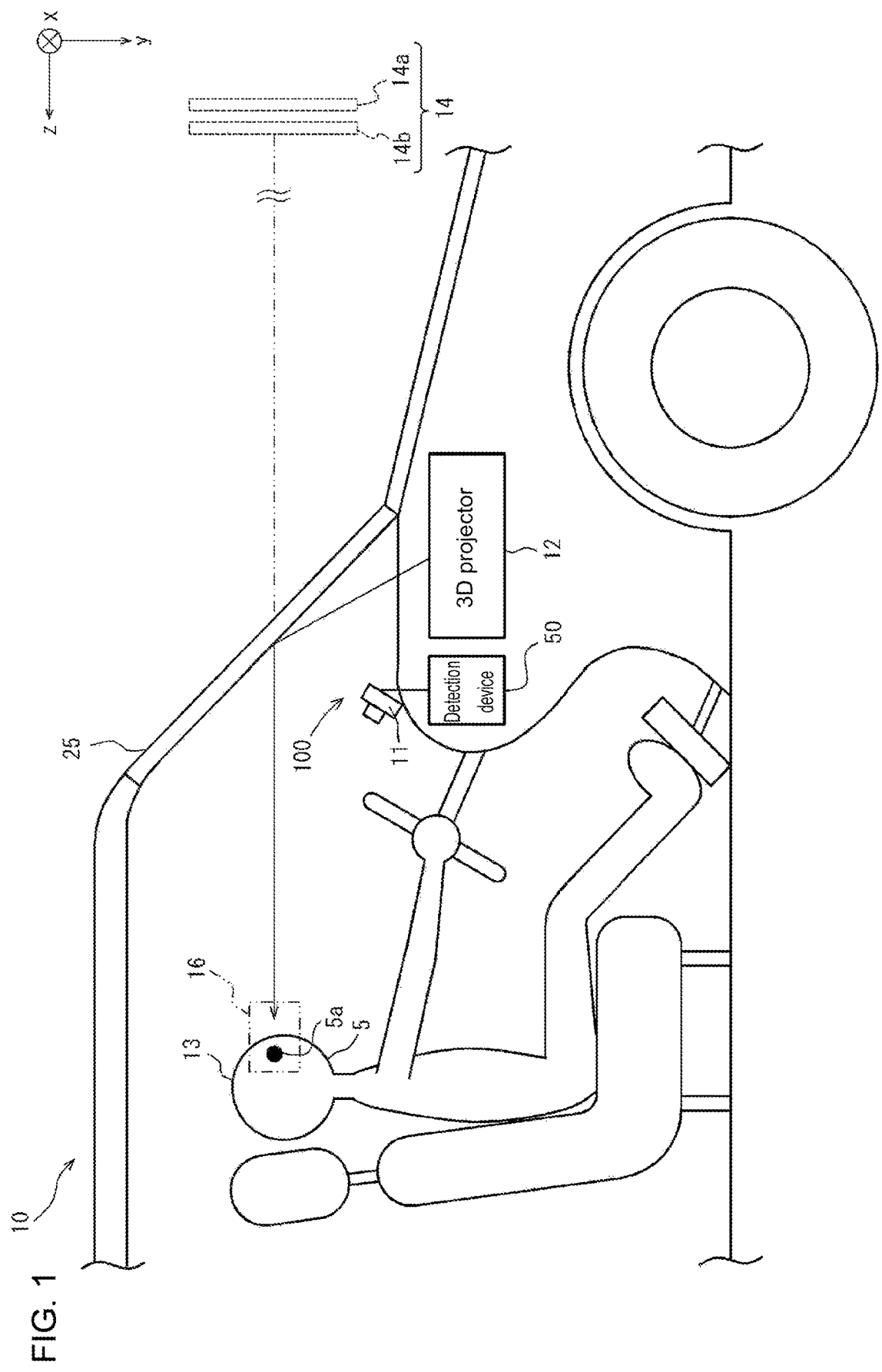
FIG. 1 is a schematic diagram of an example movable body incorporating a detection device.

As illustrated in FIG. 1, a detection device 50 according to one embodiment of the present disclosure may be mounted on a movable body 10. The detection device 50 includes an input device 30 and a detector 15. The movable body 10 may include a three-dimensional (3D) projection system 100 as an image display system. The 3D projection system 100 includes a camera 11, the detection device 50, and a 3D projector 12.

Examples of the movable body in the present disclosure include a vehicle, a vessel, and an aircraft. Examples of the vehicle include an automobile, an industrial vehicle, a railroad vehicle, a community vehicle, and a fixed-wing aircraft traveling on a runway. Examples of the automobile include a passenger vehicle, a truck, a bus, a motorcycle, and a trolley bus. Examples of the industrial vehicle include an industrial vehicle for agriculture and an industrial vehicle for construction. Examples of the industrial vehicle include a forklift and a golf cart. Examples of the industrial vehicle for agriculture include a tractor, a cultivator, a transplanter, a binder, a combine, and a lawn mower. Examples of the industrial vehicle for construction include a bulldozer, a scraper, a power shovel, a crane vehicle, a dump truck, and a road roller. Examples of the vehicle may include man-powered vehicles. The classification of the vehicle is not limited to the above examples. Examples of the automobile include an industrial vehicle travelling on a road. One type of vehicle may fall within multiple classes. Examples of the vessel include a jet ski, a boat, and a tanker. Examples of the aircraft include a fixed-wing aircraft and a rotary-wing aircraft.

In the example described below, the movable body 10 is a passenger vehicle. The movable body 10 may be any of the above examples instead of a passenger vehicle. The camera 11 may be attached to the movable body 10. The camera 11 captures an image including a face 5 of a driver as a user 13 of the movable body 10. The camera 11 captures an image including an area expected to include the face 5 of the driver as the user 13 of the movable body 10. The camera 11 may be attached at any position inside or outside the movable body 10. For example, the camera 11 may be inside a dashboard in the movable body 10.

The camera 11 may be a visible light camera or an infrared camera. The camera 11 may function both as a visible light camera and an infrared camera. The camera 11 may include, for example, a charge-coupled device (CCD) image sensor or a complementary metal-oxide semiconductor (CMOS) image sensor.

The camera 11 outputs image information about a captured image to the detection device 50. The image information about the image captured with the camera 11 is output to the detection device 50. The input device 30 in the detection device 50 receives input of the image information output from the camera 11. The detector 15 performs a detection process to detect the positions of eyes 5a of the user 13. The camera 11 may output an image to the detection device 50 for every frame. The detection device 50 may detect the positions of the eyes 5a for every frame.

The detection process performed by the detector 15 may be, for example, a process to detect the positions of the eyes 5a of the user 13 based on image information input into the input device 30. The detector 15 performs a first process and a second process as the detection process. The first process is to detect first positions of the eyes 5a by template matching based on the image information. The second process is to detect the position of the face 5 by template matching based on the image information and to detect second positions of the eyes 5a based on the detected position of the face 5. The positions of the eyes 5a of the user 13 may be the positions of pupils. Template matching may be, for example, image processing of searching a target image for a position with the highest degree of matching with a template image. In an embodiment of the present disclosure, the detection device 50 uses a captured image 51 output from the camera 11 as a target image.

Figure 2:
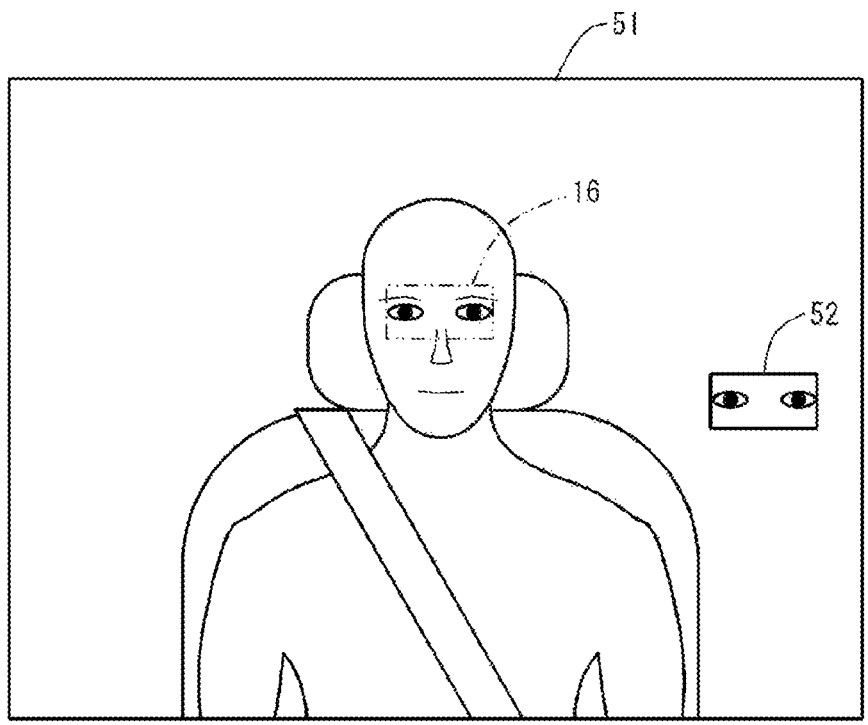
FIG. 2 is a schematic diagram describing template matching for eyes.

In the first process, the detector 15 detects the first positions. In the first process, the detector 15 may detect the positions of the eyes 5a as the first positions by template matching based on the captured image 51. A first template image 52 used in the first process includes the eye 5a of the user 13 or a part of the face determined to have a relative positional relationship with the eye 5a of the user 13. The first template image 52 may include, as the eye 5a of the user 13, the two eyes, the right eye alone, or the left eye alone. The part of the face determined to have a relative positional relationship with the eye(s) 5a of the user 13 may be, for example, the eyebrow(s) or the nose. In the example of FIG. 2, the first template image 52 includes the two eyes as the eyes 5a of the user 13.

Figure 3:
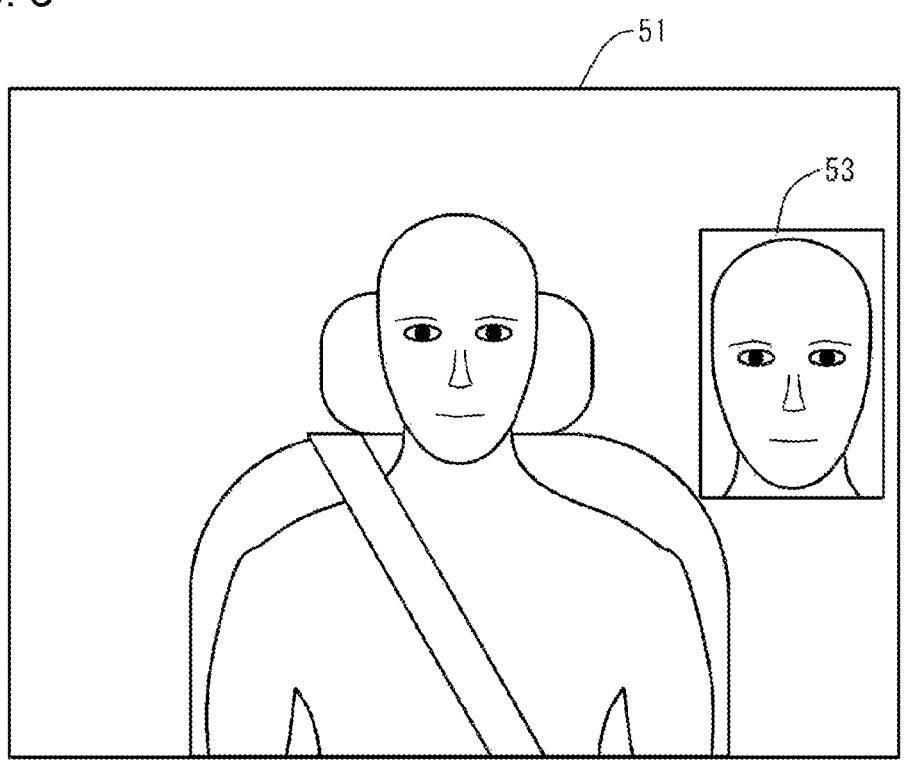
FIG. 3 is a schematic diagram describing template matching for a face.

In the second process, the detector 15 detects the second positions. In the second process, the detector 15 may detect the position of the face 5 by template matching based on the captured image 51 and detect the positions of the eyes 5a as the second positions based on the detected position of the face 5. A second template image 53 used in the second process is different from the first template image 52 used in the first process. The second template image 53 used in the second process includes a larger area for comparison than the first template image 52 used in the first process. As illustrated in the example of FIG. 3, the second template image 53 used in the second process includes, for example, the face 5 of the user 13. For the single user 13, the positions of the eyes 5a in the face 5 do not change and thus can be predetermined. The detector 15 detecting the position of the face 5 by template matching based on the captured image 51 can detect the predetermined positions of the eyes 5a in the face 5 (the second positions) based on the detected position of the face 5.

Known pupil position detection based on a captured image uses a captured image including the pupils of a user. With a captured image that does not include pupils, the pupil positions cannot be detected. For example, the pupil positions cannot be detected based on an image of the user captured when the user's eyes are closed, such as when the user is blinking. The structure in an embodiment of the present disclosure uses template matching of searching the captured image 51 for positions with the highest degree of matching with the first and second template images 52 and 53, and thus can search the captured image 51 for positions with the highest degree of matching using features other than the pupils in the first and second template images 52 and 53 when the captured image 51 does not include pupils. The first and second template images 52 and 53 are larger than the pupils. Thus, template matching involves less computation than pupil position detection when performed using, as the detection target, the captured image 51 with the same size as the template images. With such less computation, the detector 15 can output a detection result at a higher computation speed in template matching than in pupil position detection. The detection device 50 performs the first process and the second process to detect the first positions and the second positions as the pupil positions and thus can output coordinate information about the first positions or the second positions to the 3D projector 12 when, for example, the user 13 moves unexpectedly or the captured image 51 has any failure.

The first and second template images 52 and 53 may each be shaped in correspondence with the shape of the captured image 51. For the captured image 51 being rectangular, the first and second template images 52 and 53 may be rectangular. The shapes of the first and second template image 52 and 53 may be or may not be similar to the shape of the captured image 51. In the example described below, the captured image 51 and the first and second template images 52 and 53 are rectangular as illustrated in FIGS. 2 and 3.

A detection result obtained by the detection device 50 may be coordinate information indicating the pupil positions of the eyes 5a of the user 13. The coordinates of the positions in the captured image 51 with the highest degree of matching with the first and second template images 52 and 53 are each determined by template matching. The coordinates of the respective matching positions resulting from template matching may, for example, correspond to the coordinates of representative positions in the first and second template images 52 and 53. Each representative position in the first and second template images 52 and 53 may be, for example, any one of the vertexes or the center of the corresponding first and second template images 52 and 53. In the first process, the detector 15 may use a first relationship that independently defines a relative coordinate positional relationship between the coordinates of the pupil positions in the first template image 52 of the eyes 5a and, for example, the representative position in the first template image 52. Upon determining the coordinates of the matching position with the first template image 52 in the captured image 51 by template matching, the detector 15 can use the determined coordinates and the first relationship to determine coordinate information about the pupil positions (hereafter referred to as first positions) in the captured image 51. The first relationship may be predefined before the first process is performed. Similarly, in the second process, the detector may use a second relationship that independently defines the relative coordinate positional relationship between the coordinates of the pupil positions in the second template image 53 of the face 5 and, for example, the representative position in the second template image 53. Upon determining the coordinates of the matching position with the second template image 53 in the captured image 51 by template matching, the detector 15 can use the determined coordinates and the second relationship to determine coordinate information about the pupil positions (hereafter referred to as second positions) in the captured image 51. For the captured image 51 with the user 13 closing the eyes 5a and thus including no pupils, for example, the detector 15 can determine coordinate information about the estimated pupil positions of the eyes being open. In the embodiment of the present disclosure, the detection device 50 can determine coordinate information about the pupil positions although the user 13 closes the eyes 5a while, for example, blinking, thus allowing successive output of coordinate information without interruption.

The detection device 50 may include, for example, a sensor. The sensor may be, for example, an ultrasonic sensor or an optical sensor. The camera 11 may detect the position of the head of the user 13 with the sensor. The camera 11 may use two or more sensors to detect the positions of the eyes 5a of the user 13 as coordinates in a 3D space.

The detection device 50 may output coordinate information about the detected pupil positions of the eyes 5a to the 3D projector 12. The 3D projector 12 may control an image to be projected based on the received coordinate information. The detection device 50 may output information indicating the pupil positions of the eyes 5a to the 3D projector 12 through wired or wireless communication. The wired communication may include, for example, a controller area network (CAN).

The detector 15 detects, as the positions of the eyes 5a of the user 13, the first positions obtained through the first process using the first template image 52 of the eyes 5a and the second positions obtained through the second process using the second template image 53 of the face 5. The coordinate information output from the detection device 50 to the 3D projector 12 may be the coordinate information about the first positions. The coordinate information output from the detection device 50 to the 3D projector 12 may be the coordinate information about the second positions. The detection device 50 may output the coordinate information about the first positions to the 3D projector 12, and may output the coordinate information about the second positions when, for example, the first positions are not detected. The detection device 50 may output the coordinate information about the second positions to the 3D projector 12 and may output the coordinate information about the first positions when, for example, the second positions are not detected.

The detector 15 may perform, as the detection process, a third process to detect third positions of the eyes 5a based on a result obtained by comparing the first positions with the second positions. The first positions and the second positions to be compared with each other may be the detection results from the first process and the second process for searching the same captured image 51. When the first positions are the same as the second positions, the detected first positions and the detected second positions can be expected to be highly accurate. The first positions being the same as the second positions indicate that a calculated difference between the coordinate information about the first positions and the coordinate information about the second positions falls within a predetermined range (hereafter, a first range). When the comparison between the first positions and the second positions in the third process reveals that the first positions are the same as the second positions, the detector 15 may, for example, detect the first positions as the positions of the eyes 5a (hereafter, third positions). When the comparison between the first positions and the second positions in the third process reveals that the first positions are different from the second positions, the detector 15 may, for example, calculate middle positions between the first positions and the second positions, and may detect the calculated middle positions as the third positions. The first positions being different from the second positions indicate that a calculated difference between the coordinate information about the first positions and the coordinate information about the second positions is outside the first range and within a second range broader than the first range. When the difference between the coordinate information about the first positions and the coordinate information about the second positions is outside the second range, either or both of the detected first positions and the detected second positions can be expected to be erroneous detection results. For such erroneous detection, the detector 15 determines, for example, that the third process has resulted in a detection failure and does not output coordinate information, and may newly perform the first process and the second process. For such erroneous detection, the detector 15 may, for example, detect the same coordinate information as the coordinate information output last time as the third positions. The third process is optional.

The detection device 50 may include the detector 15 that is an external device. The input device 30 may output the captured image 51 received from the camera 11 to the external detector 15. The external detector 15 may detect the pupil positions of the eyes 5a of the user 13 by template matching based on the captured image 51. The external detector 15 may output the coordinate information about the detected pupil positions of the eyes 5a to the 3D projector 12. The 3D projector 12 may control an image to be projected based on the received coordinate information. The input device 30 may output the captured image 51 to the external detector 15 through wired or wireless communication. The external detector 15 may output the coordinate information to the 3D projector 12 through wired or wireless communication. Wired communication may include, for example, communication using a CAN.

The 3D projector 12 may be at any position inside or outside the movable body 10. For example, the 3D projector 12 may be inside the dashboard in the movable body 10. The 3D projector 12 emits image light toward a windshield 25.

The windshield 25 reflects image light emitted from the 3D projector 12. The image light reflected from the windshield 25 reaches an eye box 16. The eye box 16 is an area in real space in which the eyes 5a of the user 13 are expected to be located based on, for example, the body shape, the posture, and changes in the posture of the user 13. The eye box 16 may have any shape. The eye box 16 may include a planar area or a 3D area. The solid arrow in FIG. 1 indicates a path traveled by at least a part of image light emitted from the 3D projector 12 to reach the eye box 16. The path traveled by image light is also referred to as an optical path. With the eyes 5a of the user 13 located in the eye box 16 receiving image light, the user 13 can view a virtual image 14. The virtual image 14 is on a path extending frontward from the movable body 10 in alignment with the path from the windshield 25 to the eyes 5a (in the figure, the straight dot-dash line). The 3D projector 12 can function as a head-up display that enables the user 13 to view the virtual image 14. In FIG. 1, the direction in which the eyes 5a of the user 13 are aligned corresponds to x-direction. The vertical direction corresponds to y-direction. The imaging range of the camera 11 includes the eye box 16.

Figure 4:
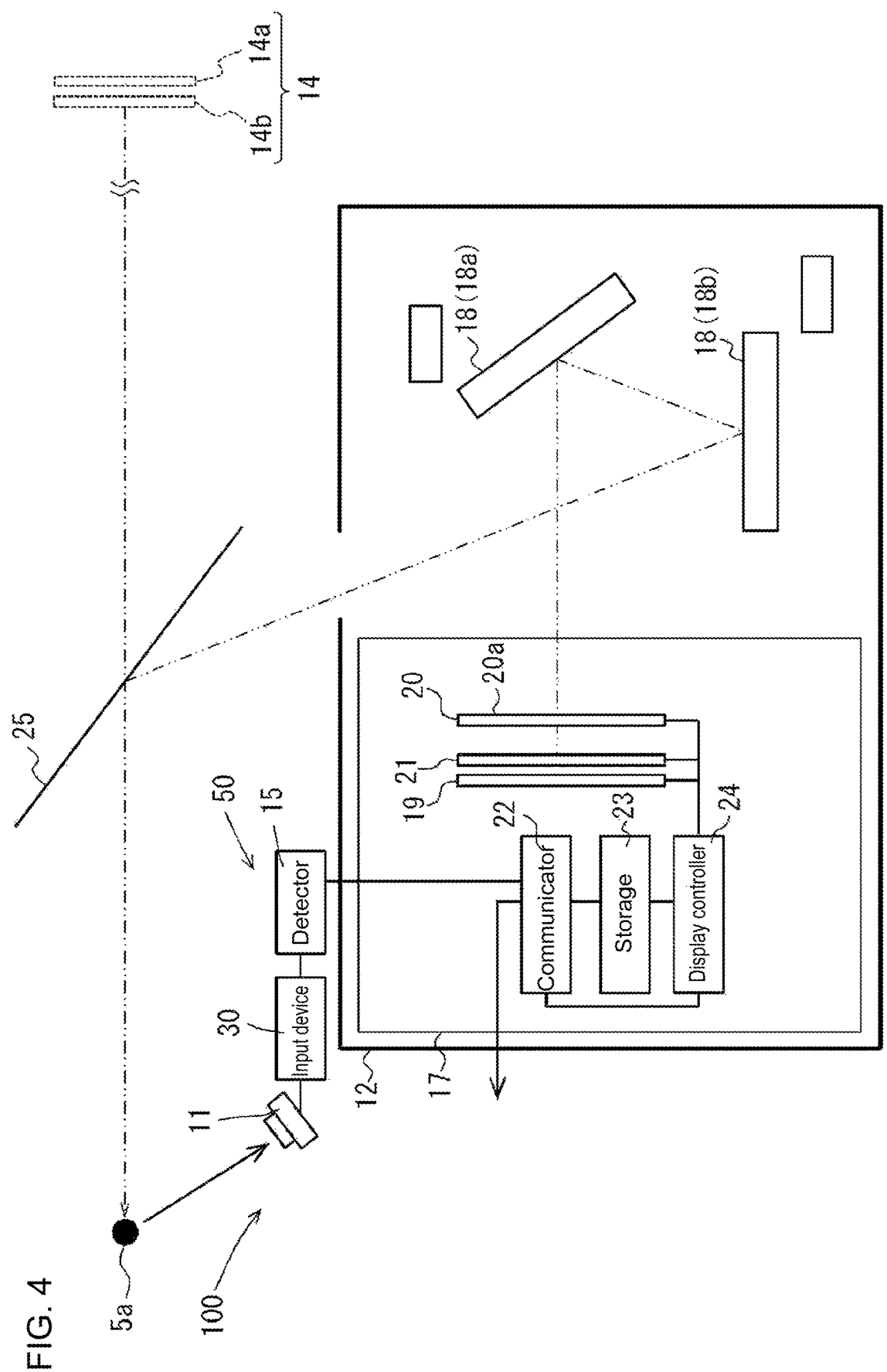
FIG. 4 is a schematic diagram of an example 3D projection system.

As illustrated in FIG. 4, the 3D projector 12 includes a 3D display device 17 and an optical element 18. The 3D projector 12 may also be referred to as an image display module. The 3D display device 17 may include a backlight 19, a display 20 including a display surface a barrier 21, and a display controller 24. The 3D display device 17 may further include a communicator 22. The 3D display device 17 may further include a storage 23.

The optical element 18 may include a first mirror 18a and a second mirror 18b. At least either the first mirror 18a or the second mirror 18b may have optical power. In the present embodiment, the first mirror 18a is a concave mirror having optical power. The second mirror 18b is a plane mirror. The optical element 18 may function as a magnifying optical system that enlarges an image displayed by the 3D display device 17. The dot-dash arrow in FIG. 4 indicates the traveling path of at least a part of image light emitted from the 3D display device 17 to be reflected from the first mirror 18a and the second mirror 18b and then exit the 3D projector 12. The image light emitted from the 3D projector 12 reaches the windshield 25, is reflected from the windshield 25, and then reaches the eyes 5a of the user 13. This allows the user 13 to view the image displayed by the 3D display device 17.

The optical element 18 and the windshield 25 allow image light emitted from the 3D display device 17 to reach the eyes 5a of the user 13. The optical element 18 and the windshield 25 may form an optical system. The optical system allows image light emitted from the 3D display device 17 to travel along the optical path indicated by the dot-dash line and reach the eyes 5a of the user 13. The optical system may control the traveling direction of image light to enlarge or reduce an image viewable by the user 13. The optical system may control the traveling direction of image light to deform an image viewable by the user 13 based on a predetermined matrix.

The optical element 18 may have a structure different from the illustrated structure. The optical element 18 may include a concave mirror, a convex mirror, or a plane mirror. The concave mirror or the convex mirror may be at least partially spherical or aspherical. The optical element 18 may be one element or may include three or more elements, instead of two elements. The optical element 18 may include a lens instead of or in addition to a mirror. The lens may be a concave lens or a convex lens. The lens may be at least partially spherical or aspherical.

The backlight 19 is more away from the user 13 than the display 20 and the barrier 21 on the optical path of image light. The backlight 19 emits light toward the barrier 21 and the display 20. At least a part of light emitted from the backlight 19 travels along the optical path indicated by the dot-dash line and reaches the eyes 5a of the user 13. The backlight 19 may include a light-emitting diode (LED) or a light emitter such as an organic electroluminescent (EL) element and an inorganic EL element. The backlight 19 may have any structure that allows control of the light intensity and the light intensity distribution.

The display 20 includes a display panel. The display 20 may be, for example, a liquid-crystal device such as a liquid-crystal display (LCD). In the present embodiment, the display 20 includes a transmissive liquid-crystal display panel. The display 20 is not limited to this, and may include any of various display panels.

The display 20 includes multiple pixels and controls the transmittance of light from the backlight 19 incident on each pixel to emit image light that then reaches the eyes 5a of the user 13. The user 13 views an image formed by image light emitted from each pixel in the display 20.

The barrier 21 defines the traveling direction of incident light. In the example of FIG. 4, with the barrier 21 being nearer the backlight 19 than the display 20, light emitted from the backlight 19 enters the barrier 21 and then enters the display 20. In this case, the barrier 21 blocks or attenuates a part of light emitted from the backlight 19 and transmits another part of the light to the display 20. The display 20 emits incident light traveling in the direction defined by the barrier 21 as image light traveling in the same direction. With the display 20 being nearer the backlight 19 than the barrier 21, light emitted from the backlight 19 enters the display 20 and then enters the barrier 21. In this case, the barrier 21 blocks or attenuates a part of image light emitted from the display 20 and transmits another part of the image light to the eyes 5a of the user 13.

Irrespective of whether the display 20 or the barrier 21 is nearer the user 13, the barrier 21 can control the traveling direction of image light. The barrier 21 allows a part of image light emitted from the display 20 to reach one of a left eye 5aL and a right eye 5aR (refer to FIG. 5 of the user 13, and another part of the image light to reach the other one of the left eye 5aL and the right eye 5aR of the user 13. In other words, the barrier 21 directs at least a part of image light toward the left eye 5aL of the user 13 and toward the right eye 5aR of the user 13. The left eye 5aL is also referred to as a first eye, and the right eye 5aR as a second eye. In the present embodiment, the barrier 21 is located between the backlight 19 and the display 20. In other words, light emitted from the backlight 19 first enters the barrier 21 and then enters the display 20.

The barrier 21 defines the traveling direction of image light to allow each of the left eye 5aL and the right eye 5aR of the user 13 to receive different image light. Each of the left eye 5aL and the right eye 5aR of the user 13 can thus view a different image.

Figure 5:
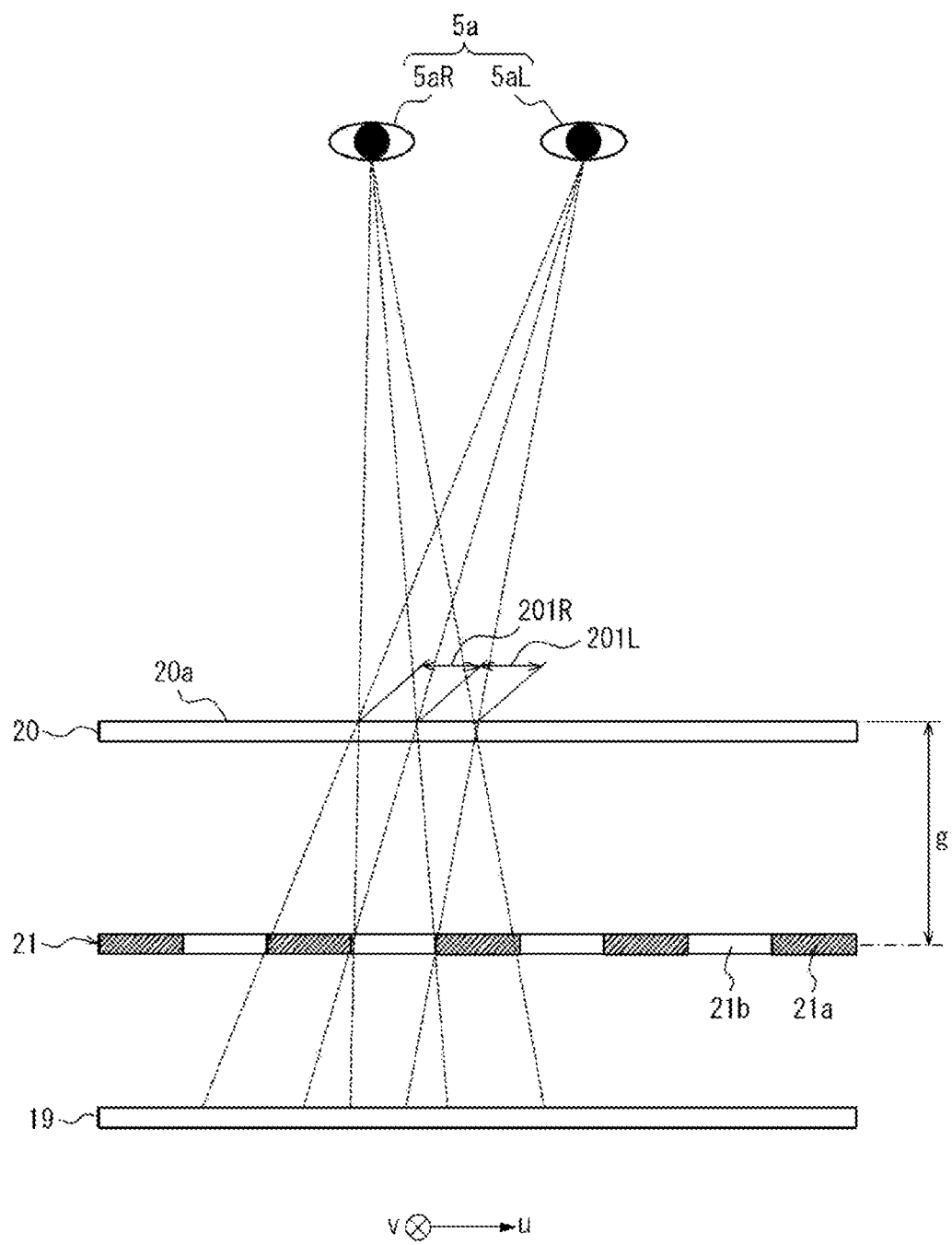
FIG. 5 is a schematic diagram describing the relationship between the eyes of a user, a display, and a barrier.

As illustrated in FIG. 5, the display 20 includes left-eye viewing areas 201L viewable by the left eye 5aL of the user 13 and right-eye viewing areas 201R viewable by the right eye 5aR of the user 13 on the display surface 20a. The display 20 displays a parallax image including left-eye images viewable by the left eye 5aL of the user 13 and right-eye images viewable by the right eye 5aR of the user 13. A parallax image refers to an image projected to the left eye 5aL and the right eye 5aR of the user 13 to generate parallax between the two eyes of the user 13. The display 20 displays a left-eye image on the left-eye viewing area 201L and a right-eye image on the right-eye viewing area 201R. In other words, the display 20 displays a parallax image on the left-eye viewing area 201L and the right-eye viewing area 201R. The left-eye viewing areas 201L and the right-eye viewing areas 201R are arranged in u-direction indicating a parallax direction. The left-eye viewing areas 201L and the right-eye viewing areas 201R may extend in v-direction orthogonal to the parallax direction, or in a direction inclined with respect to v-direction at a predetermined angle. In other words, the left-eye viewing areas 201L and the right-eye viewing areas 201R may be arranged alternately in a predetermined direction including a component in the parallax direction. The pitch between the alternately arranged left-eye viewing areas 201L and right-eye viewing areas 201R is also referred to as a parallax image pitch. The left-eye viewing areas 201L and the right-eye viewing areas 201R may be spaced from each other or adjacent to each other. The display 20 may further include a display area to display a planar image on the display surface 20a. A planar image generates no parallax between the eyes 5a of the user 13 and is not viewed stereoscopically.

As illustrated in FIG. 5, the barrier 21 includes open portions 21b and light-blocking portions 21a. The barrier 21 located nearer the user 13 than the display 20 on the optical path of image light controls the transmittance of image light emitted from the display 20. The open portions 21b transmit light entering the barrier 21 from the display 20. The open portions 21b may transmit light with a transmittance of a first predetermined value or greater. The first predetermined value may be, for example, 100% or a value close to 100%. The light-blocking portions 21a block light entering the barrier 21 from the display 20. The light-blocking portions 21a may transmit light with a transmittance of a second predetermined value or less. The second predetermined value may be, for example, 0% or a value close to 0%. The first predetermined value is greater than the second predetermined value.

The open portions 21b and the light-blocking portions 21a are arranged alternately in u-direction indicating the parallax direction. The boundaries between the open portions 21b and the light-blocking portions 21a may extend in v-direction orthogonal to the parallax direction as illustrated in FIG. 4, or in a direction inclined with respect to v-direction at a predetermined angle. In other words, the open portions 21b and the light-blocking portions 21a may be arranged alternately in a predetermined direction including a component in the parallax direction.

In the present embodiment, the barrier 21 is more away from the user 13 than the display 20 on the optical path of image light. The barrier 21 controls the transmittance of light directed from the backlight 19 to the display 20. The open portions 21b transmit light directed from the backlight 19 to the display 20. The light-blocking portions 21a block light directed from the backlight 19 to the display 20. This structure allows light entering the display 20 to travel in a predetermined direction. Thus, the barrier 21 can control a part of image light to reach the left eye 5aL of the user 13, and another part of the image light to reach the right eye of the user 13.

The barrier 21 may include a liquid crystal shutter. The liquid crystal shutter can control the transmittance of light in accordance with a voltage applied. The liquid crystal shutter may include multiple pixels and control the transmittance of light for each pixel. A liquid crystal shutter can form an area with high light transmittance or an area with low light transmittance in an intended shape. The open portions 21b in the barrier 21 including a liquid crystal shutter may have a transmittance of the first predetermined value or greater. The light-blocking portions 21a in the barrier 21 including a liquid crystal shutter may have a transmittance of the second predetermined value or less. The first predetermined value may be greater than the second predetermined value. The ratio of the second predetermined value to the first predetermined value may be set to 1/100 in one example. The ratio of the second predetermined value to the first predetermined value may be set to 1/1000 in another example. The barrier 21 including the open portions 21b and the light-blocking portions 21a that can shift is also referred to as an active barrier.

The display controller 24 controls the display 20. The display controller 24 may control the barrier 21 that is an active barrier. The display controller 24 may control the backlight 19. The display controller 24 obtains coordinate information about the pupil positions of the eyes 5a of the user 13 from the detection device 50, and controls the display based on the coordinate information. The display controller 24 may control at least one of the barrier 21 or the backlight 19 based on the coordinate information. The display controller 24 may receive an image output from the camera 11 and detect the eyes 5a of the user 13 by the template matching described above based on the received image. In other words, the display controller 24 may have the same function as and may serve as the detector 15 (controller). The display controller 24 may control the display 20 based on the detected pupil positions of the eyes 5a. The display controller 24 can control at least one of the barrier 21 or the backlight 19 based on the detected pupil positions of the eyes 5a. The display controller 24 and the detector 15 may be, for example, processors. The display controller 24 and the detector 15 may each include one or more processors. The processors may include a general-purpose processor that reads a specific program to perform a specific function, and a processor dedicated to specific processing. The dedicated processor may include an application-specific integrated circuit (ASIC). The processors may include a programmable logic device (PLD). The PLD may include a field-programmable gate array (FPGA). The display controller 24 and the detector 15 may each be a system on a chip (SoC) or a system in a package (SiP) in which one or more processors cooperate with other components.

The communicator 22 may include an interface that can communicate with an external device. The external device may include, for example, the detection device 50. The external device may, for example, provide image information about images to be displayed on the display 20. The communicator 22 may obtain various sets of information from the external device such as the detection device 50 and output the information to the display controller 24. The interface that can perform communication in the present disclosure may include, for example, a physical connector and a wireless communication device. The physical connector may include an electric connector for transmission with electric signals, an optical connector for transmission with optical signals, and an electromagnetic connector for transmission with electromagnetic waves. The electric connector may include a connector complying with IEC 60603, a connector complying with the universal serial bus (USB) standard, or a connector used for an RCA terminal. The electric connector may include a connector used for an S terminal specified by EIAJ CP-121aA or a connector used for a D terminal specified by EIAJ RC-5237. The electric connector may include a connector complying with the High-Definition Multimedia Interface (HDMI, registered trademark) standard or a connector used for a coaxial cable including a British Naval Connector, also known as, for example, a Baby-series N Connector (BNC). The optical connector may include a connector complying with IEC 61754. The wireless communication device may include a wireless communication device complying with the Bluetooth (registered trademark) standard and a wireless communication device complying with other standards including IEEE 8021a. The wireless communication device includes at least one antenna.

The storage 23 may store various sets of information or programs for causing the components of the 3D display device 17 to operate. The storage 23 may include, for example, a semiconductor memory. The storage 23 may function as a work memory for the display controller 24. The display controller 24 may include the storage 23.

As illustrated in FIG. 5, light emitted from the backlight 19 passes through the barrier 21 and the display 20 to reach the eyes 5a of the user 13. The broken lines indicate the paths traveled by light from the backlight 19 to reach the eyes 5a. The light through the open portions 21b in the barrier 21 to reach the right eye 5aR passes through the right-eye viewing areas 201R in the display 20. In other words, the light through the open portions 21b allows the right eye 5aR to view the right-eye viewing areas 201R. The light through the open portions 21b in the barrier 21 to reach the left eye 5aL passes through the left-eye viewing areas 201L in the display 20. In other words, the light through the open portions 21b allows the left eye 5aL to view the left-eye viewing areas 201L.

The display 20 displays right-eye images on the right-eye viewing areas 201R and left-eye images on the left-eye viewing areas 201L. Thus, the barrier 21 allows image light for the left-eye images to reach the left eye 5aL and image light for the right-eye images to reach the right eye 5aR. More specifically, the open portions 21b allow image light for the left-eye images to reach the left eye 5aL of the user 13 and image light for the right-eye images to reach the right eye 5aR of the user 13. The 3D display device 17 with this structure can project a parallax image to the two eyes of the user 13. The user 13 views a parallax image with the left eye 5aL and the right eye 5aR to view the image stereoscopically.

Image light transmitting through the open portions 21b in the barrier 21 and emitted from the display surface 20a of the display 20 at least partially reaches the windshield 25 through the optical element 18. The image light is reflected from the windshield 25 and reaches the eyes 5a of the user 13. This allows the eyes 5a of the user 13 to view a second virtual image 14b located more away in the negative z-direction than the windshield 25. The second virtual image 14b corresponds to the image appearing on the display surface 20a. The open portions 21b and the light-blocking portions 21a in the barrier 21 form a first virtual image 14a in front of the windshield 25 and more away in the negative z-direction than the second virtual image 14b. As illustrated in FIG. 1, the user 13 can view an image with the display 20 appearing to be at the position of the second virtual image 14b and the barrier 21 appearing to be at the position of the first virtual image 14a.

The 3D display device 17 emits image light for the image appearing on the display surface 20a in a direction defined by the barrier 21. The optical element 18 directs the image light to the windshield 25. The optical element 18 may reflect or refract the image light. The windshield 25 reflects the image light to direct the light to the eyes 5a of the user 13. The image light entering the eyes 5a of the user 13 causes the user 13 to view a parallax image as a virtual image 14. The user 13 views the virtual image 14 stereoscopically. An image corresponding to the parallax image in the virtual image 14 is also referred to as a parallax virtual image. A parallax virtual image is a parallax image projected through the optical system. An image corresponding to the planar image in the virtual image 14 is also referred to as a planar virtual image. A planar virtual image is a planar image projected through the optical system.

Before starting the search through the template matching, the detection device 50 generates the first and second template images 52 and 53 based on the captured image 51 captured with the camera 11. The detector 15 may perform pupil detection in the entire captured image 51 and use a predetermined peripheral area including the detected pupils as the first template image 52. The predetermined peripheral area to be generated as the first template image 52 may be, for example, an area corresponding to the eye box 16 in the 3D projector 12. The detector 15 may perform face detection in the entire captured image 51 and use a predetermined peripheral area including the detected face as the second template image 53.

Pupil detection in template image generation may use a known pupil detection process. The detection device 50 may use, as a known pupil detection process, a pupil detection process using, for example, a luminance difference between corneal reflex and a pupil. Face detection in template image generation may use a known face detection process. As a known face detection process, the detection device 50 may use a face detection process combining, for example, feature values of parts such as eyes, a nose, or a mouth, and contour extraction.

Figure 6:
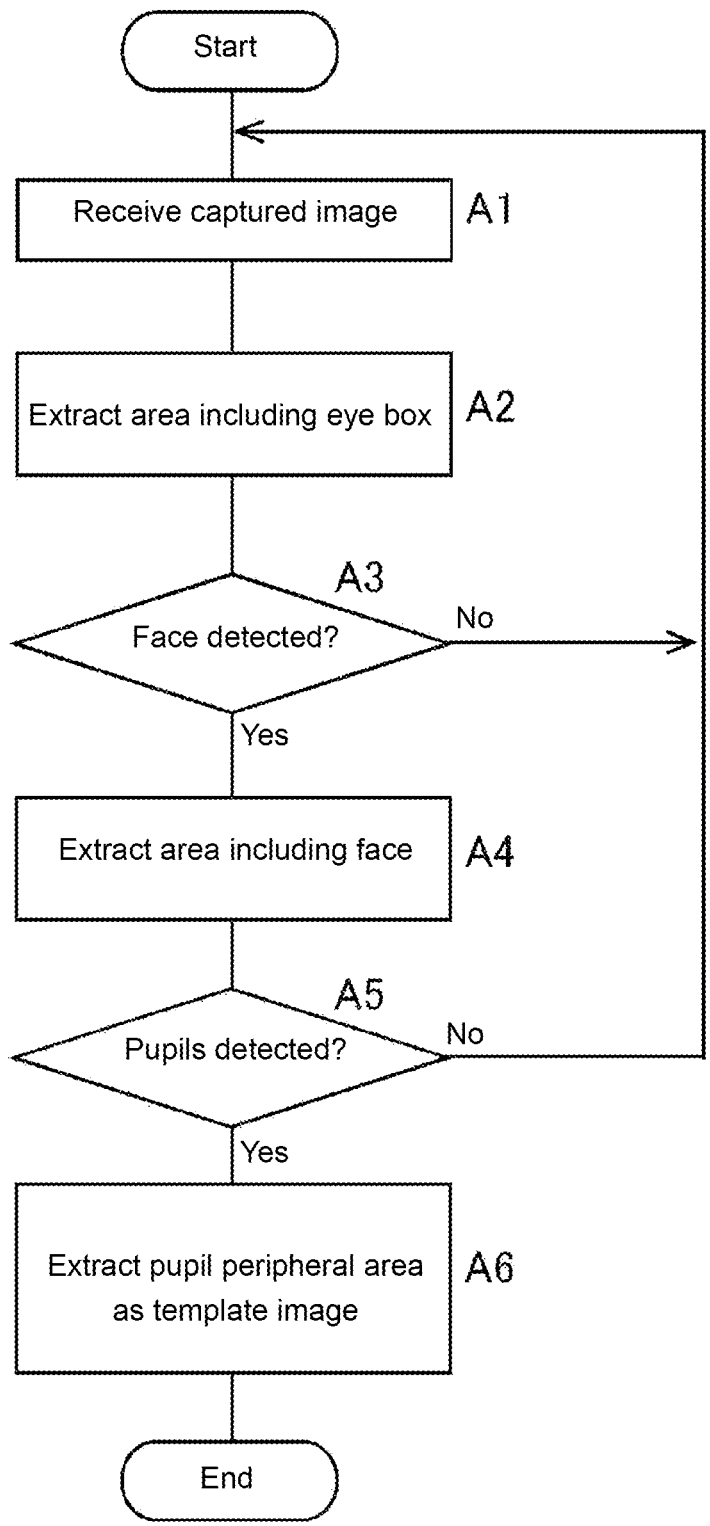
FIG. 6 is a flowchart of an example template image generation process performed by the detection device.

A template image generation process will now be described with reference to a flowchart. The detection device 50 may perform, for example, the template image generation process in the flowchart of FIG. 6. The detection device 50 may start the template image generation process when, for example, the 3D projection system 100 is activated (powered on). In step A1, the input device 30 receives input of the captured image 51 captured with the camera 11. The captured image 51 captured with the camera 11 includes, for example, the face of the user 13 seated in a seat of the movable body 10. In subsequent step A2, the detector 15 extracts a first area including the eye box 16 from the captured image 51. In step A3, the detector 15 performs face detection on the extracted first area to determine whether the face 5 of the user 13 is detected. In response to the face 5 being detected, the detection device 50 advances the processing to step A4. In response to no face 5 being detected, the detection device 50 returns the processing to step A1.

In step A4, the detector 15 extracts a second area including the detected face 5 from the first area and extracts a second template image 53 of the face 5. In step A5, the detector 15 performs pupil detection in the second area and determines whether the pupils are detected. In response to the pupils being detected, the detection device 50 advances the processing to step A6. In response to no pupils being detected, the detection device 50 returns the processing to step A1. In step A6, the detector 15 extracts a pupil peripheral area including the detected pupils as the first template image 52 of the eyes 5a. The template image generation process ends. The detector 15 may store the extracted first and second template images 52 and 53 into, for example, a storage area included in the detector 15 or into the storage 23. The detector 15 may extract, for example, a pupil peripheral area with the same size as the eye box 16 as the first template image 52. The detector 15 may also store the relative coordinate positional relationship between the representative position in each of the first and second template images 52 and 53 and the corresponding pupil positions, together with the first and second template images 52 and 53.

The first and second template images 52 and 53 may be temporarily stored into the storage area in the detector 15 or the storage 23 while the 3D projection system 100 is being activated. The first and second template images 52 and 53 may be, for example, associated with the imaged user 13 and stored into the storage 23. The first and second template images 52 and 53 stored in the storage 23 can be subsequently read from the storage 23 by the detector 15 at, for example, subsequent activation of the 3D projection system 100. This eliminates the template image generation process. The detector 15 can perform the template image generation process again to update the first and second template images 52 and 53 stored in the storage 23.

The pupil detection process in the template image generation process has higher detection accuracy but uses a longer processing time for detection than the pupil detection process (first process) using template matching. The pupil detection process using template matching can detect pupils, for example, for every frame output from the camera 11 based on its shorter processing time. The pupil detection process in the template image generation process can detect pupils, for example, every several frames output from the camera 11 based on its longer processing time. The detector 15 may repeat the template image generation process every several frames to update the first and second template images 52 and 53 stored in the storage 23.

The positions of the eyes 5a detected through the pupil detection process in the template image generation process may be used to determine the validity of the positions of the eyes 5a detected by template matching. The detector 15 may perform a pupil detection process as a fourth process. The pupil detection process performed as the fourth process may or may not use the same processing in the template image generation process. The positions of the eyes 5a detected in the fourth process may be fourth positions. The detector 15 may perform the fourth process periodically. The detector 15 may perform the fourth process, for example, every several frames. The detector 15 may perform the first process and the fourth process in parallel. The detector 15 performing the fourth process and the first process in parallel may detect the positions of the eyes 5a of the user while performing the fourth process.

The detector 15 may perform a fifth process for comparing the fourth positions with the first positions, the second positions, or the third positions being the positions of the eyes 5a detected by template matching. After each fourth process, the detector 15 may perform the fifth process using the fourth positions detected in the fourth process. The detector 15 may store the captured image 51 used in the template image generation process for comparing the fourth positions with the first, second, and third positions detected in the same captured image 51. The fourth positions are detected more accurately than the first, second, and third positions. The detector 15 may compare the fourth positions with each of the first, second, and third positions to determine the validity. The detector 15 may calculate, for example, respective difference values between the fourth positions and the first, second, and third positions, and may determine whether each difference value is within a predetermined range. Positions with the difference values within the predetermined range can be expected to have been detected with high accuracy similar to that of the fourth positions. Positions with the difference values outside the predetermined range can be expected to be detected erroneously. After calculating the respective difference values between the fourth positions and the first, second, and third positions, the detector 15 may output the coordinate information about a position with the difference value within the predetermined range to the 3D projector 12. When multiple positions each have a difference value within the predetermined range, the coordinate information about the position with the smallest difference value may be output to the 3D projector 12. When the detector 15 calculating the respective difference values between the fourth positions and the first, second, and third positions determines that the difference values are all outside the predetermined range, the coordinate information about the fourth positions may be output to the 3D projector 12.

A template matching process will be described with reference to a flowchart. The detection device 50 may perform the first process using the first template image 52 of the eyes 5a and the second process using the second template image 53 of the face 5 as the template matching process. The detection device 50 may perform, for example, the first process in the flowchart of FIG. 7A and the second process in the flowchart of FIG. 7B. The detection device 50 may perform, for example, the template image generation process in response to activation of the 3D projection system 100, and start the template matching process after the template image generation process ends. The use of the first and second template images 52 and 53 prestored in the storage 23 may eliminate the template image generation process. The detection device 50 may thus start the template matching process in response to activation of the 3D projection system 100.

The first process will now be described. In step B1, the input device 30 receives input of the captured image 51 captured with the camera 11. In step B2, the detector 15 extracts an area surrounding the position at which the first template image 52 of the eyes 5a is extracted in the template image generation process from the captured image 51 as a search range. The coordinates of the position at which the first template image 52 of the eyes 5a is extracted may be stored in a manner associated with the first template image 52 of the eyes 5a. In step B3, the detector 15 performs template matching for the search range using the first template image 52 of the eyes 5a. The detector 15 determines a position with the highest degree of matching with the first template image 52 of the eyes 5a within the search range and the degree of matching by template matching. In step B4, the detector 15 determines whether the determined degree of matching is greater than or equal to a threshold. When the value is greater than or equal to the threshold, the processing advances to step B5. When the value is less than the threshold, the processing returns to step B1. In step B5, the detector 15 determines the coordinates of the pupil positions (first positions) in the captured image 51 based on the coordinates of the position with the highest degree of matching with the first template image 52 of the eyes 5a within the search range and the predefined coordinate positional relationship (first relationship), and ends the template matching process.

The second process will now be described. In step B11, the input device 30 receives input of the captured image 51 captured with the camera 11. In step B12, the detector 15 extracts an area surrounding the position at which the second template image 53 of the face 5 is extracted in the template image generation process from the captured image 51 as a search range.

The coordinates of the position at which the second template image 53 of the face 5 is extracted may be stored in a manner associated with the second template image 53 of the face 5. In step B13, the detector 15 performs template matching for the search range using the second template image 53 of the face 5. The detector 15 determines a position with the highest degree of matching with the second template image 53 of the face 5 within the search range and the degree of matching by template matching. In step B14, the detector 15 determines whether the determined degree of matching is greater than or equal to a threshold. When the value is greater than or equal to the threshold, the processing advances to step B15. When the value is less than the threshold, the processing returns to step B11. In step B15, the detector 15 determines the coordinates of the pupil positions (second positions) in the captured image 51 based on the coordinates of the position with the highest degree of matching with the second template image 53 of the face 5 within the search range and the predefined coordinate positional relationship (second relationship), and ends the template matching process.

The first process and the second process performed on the same input captured image 51 may be asynchronous processing. The first process and the second process proceed separately to determine the first positions and the second positions. The coordinate information about the determined first positions or the determined second positions is output from the detection device 50 to the 3D projector 12. As described above, the detector 15 may determine to output the coordinate information about either the first positions or the second positions. In the 3D projector 12, the display controller 24 controls the parallax image displayed on the display 20 based on the coordinate information about the pupil positions obtained from the detection device 50.

The detection device 50 may further perform the third process. The detection device 50 may perform, for example, the third process in the flowchart of FIG. 7C. The detection device 50 may start the third process, for example, after determining the first positions and the second positions. In step S1, the detector 15 compares the first positions with the second positions. The first positions and the second positions to be compared with each other may be the detection results from the first process and the second process for searching the same captured image 51. The processing in step S2 determines whether the first positions are the same as the second positions. When, for example, the difference between the coordinate information about the first positions and the coordinate information about the second range is calculated to be within the first range, the positions are determined to be the same. In step S3, with the first positions being the same as the second positions, the detector determines the first positions as the third positions that are the pupil positions in the captured image 51 and determines the coordinates, and ends the third process. In step S4, with the first positions being different from the second positions, the detector 15 determines whether the detection is a failure. When, for example, the difference between the coordinate information about the first positions and the coordinate information about the second positions is outside the second range, the detection may be determined to be a failure. In response to the detection being a failure, the detector 15 does not determine the coordinates of the third positions and ends the third process. In step S5, in response to the detection not being a failure, the detector 15 determines the middle positions between the first positions and the second positions as the third positions that are the pupil positions in the captured image 51 and determines the coordinates, and ends the third process. When, for example, the difference between the coordinate information about the first positions and the coordinate information about the second positions is outside the first range but within the second range, the detection may be determined not being a failure.

The driver's seat of the movable body 10 is, for example, movable in the front-rear direction. The posture of the user may also change during the operation of the movable body 10. In this case, the detection device 50 may perform another example template matching process described below. The front or rear position of the driver's seat or the posture of the user 13 may change. The face of the user 13 may then move in z-direction. When the face of the user 13 moves in the positive z-direction, the face of the user 13 is captured to be smaller in the captured image 51 than before the movement. When the face of the user 13 moves in the negative z-direction, the face of the user 13 is captured to be larger in the captured image 51 than before the movement. In this case, the detection device 50 may scale the first and second template images 52 and 53, and perform template matching using the scaled first and second template images 52 and 53. The detection device 50 may perform template matching using, for example, multiple first and second template images 52 and 53 with different enlargement factors. The detection device 50 may perform template matching using, for example, multiple first and second template images 52 and 53 with different reduction factors.

Figure 8:
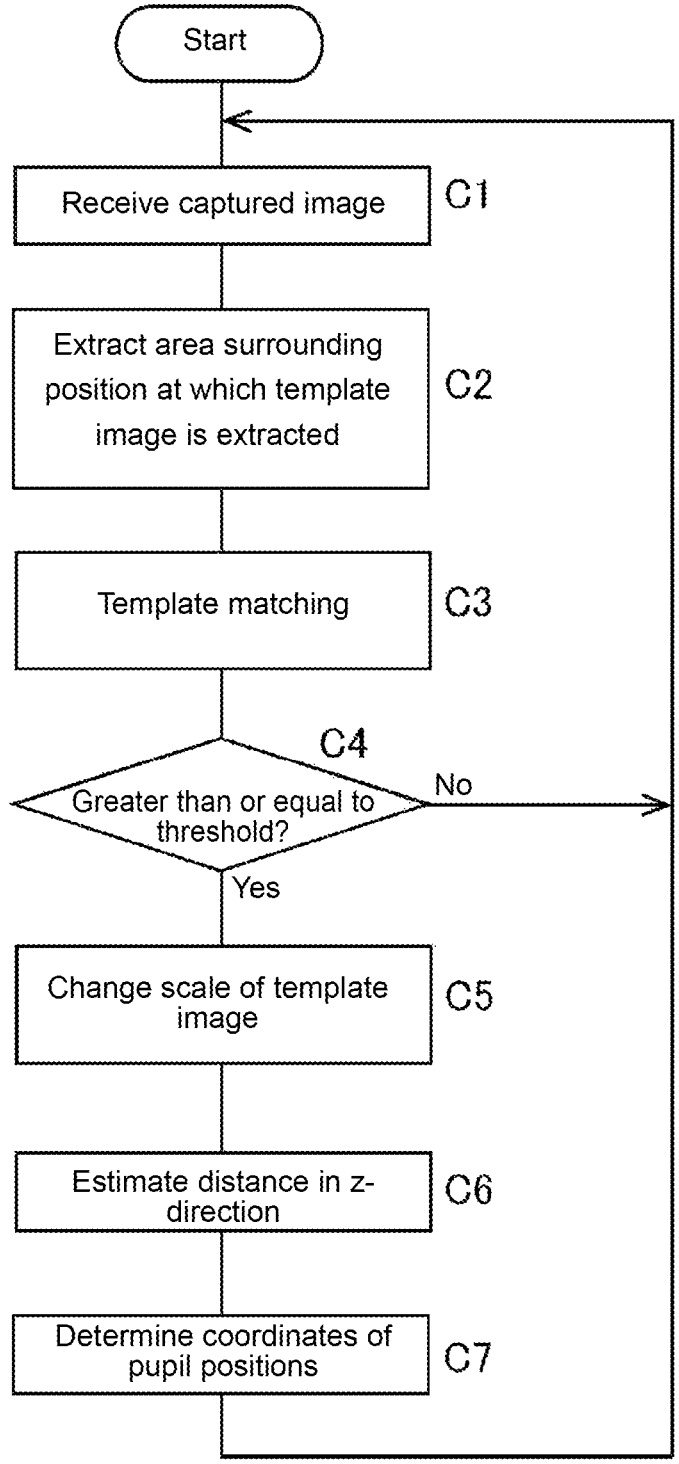
FIG. 8 is a flowchart of other example template matching of the first process.

The template matching process in another example will be described with reference to a flowchart. The detection device 50 may perform, for example, the template matching process in the flowchart of FIG. 8. The detection device 50 may perform, for example, the template image generation process in response to activation of the 3D projection system 100, and start the template matching process after the template image generation process ends. The use of the first and second template images 52 and 53 prestored in the storage 23 may eliminate the template image generation process. The detection device 50 may thus start the template matching process in response to activation of the 3D projection system 100.

Figure 7A:
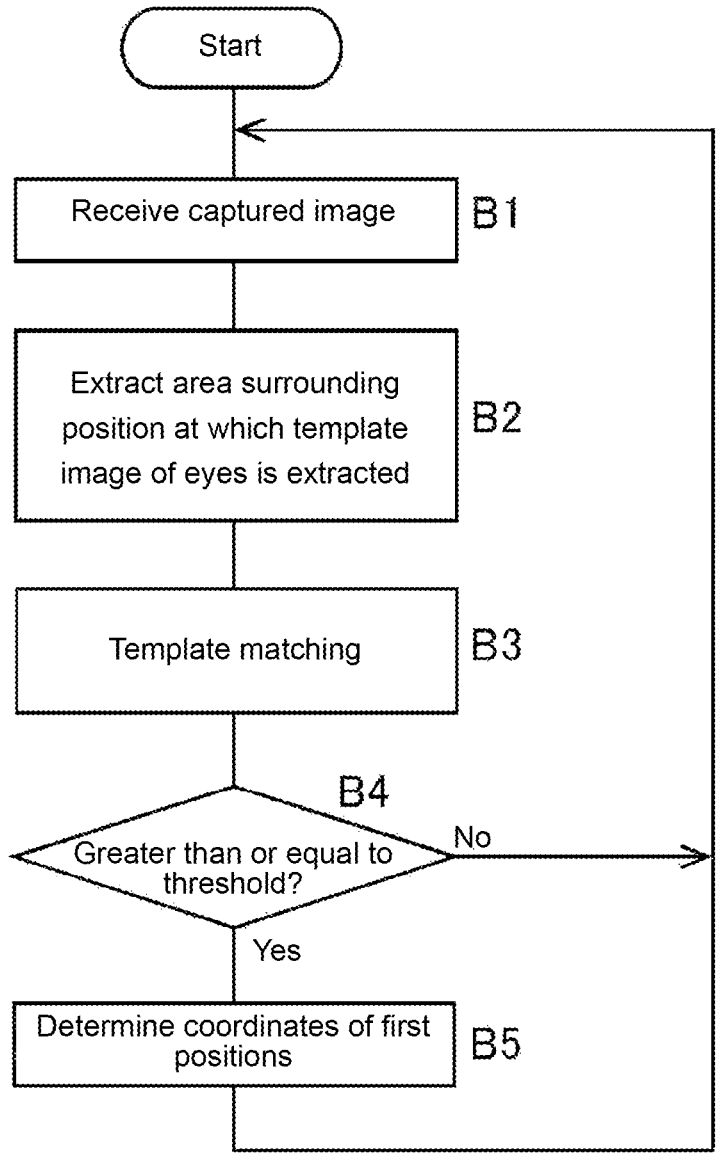
FIG. 7A is a flowchart of example template matching of a first process.
Figure 7B:
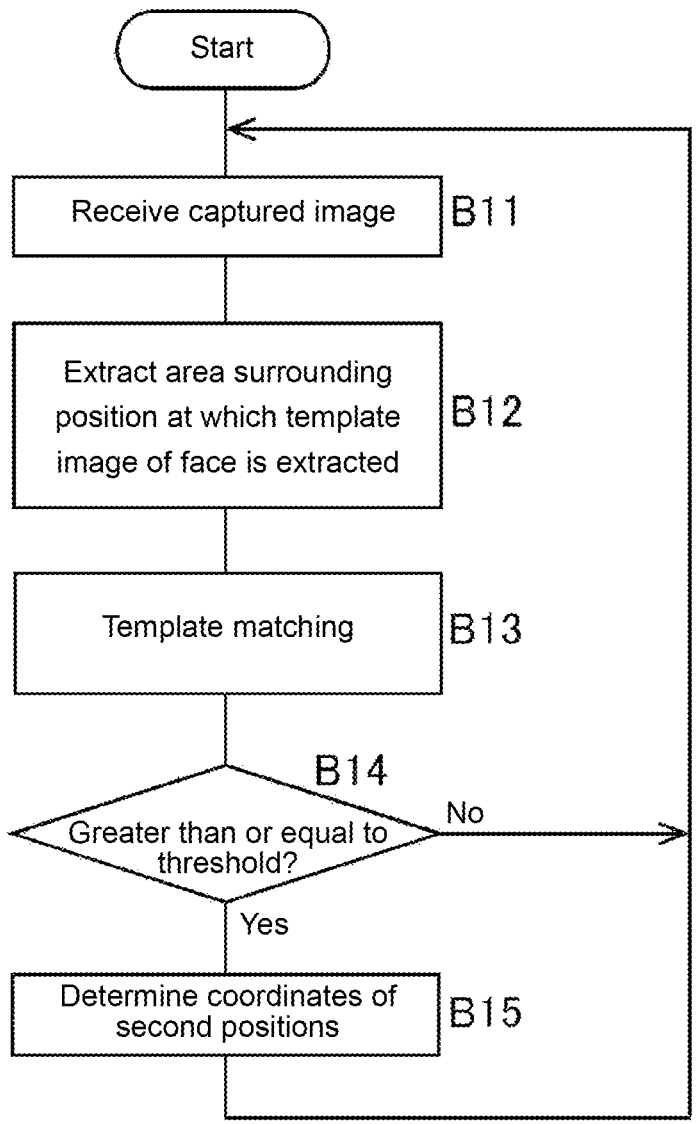
FIG. 7B is a flowchart of example template matching of a second process.

Another example first process will now be described. The processing in steps B1 to B4 in FIG. 7A is the same as the processing in steps C1 to C4 in FIG. 8 and will not be described repeatedly. In step C5, the detector 15 performs a scaling process on the first template image 52 using multiple scaling factors for the first template image 52 of the eyes 5a. The detector 15 performs template matching using each first template image 52 of the eyes 5a resulting from the scaling process. The detection device 50 does not detect directions of changes in the posture of the user 13 and performs both enlargement and reduction processes as the scaling process. With multiple first template images 52 of the eyes 5a generated through the scaling process, the detector 15 performs template matching using the multiple first template images 52 of the eyes 5a to determine a first template image 52 of the eyes 5a with the highest degree of matching. In step C6, the detector 15 estimates the position of the user 13 in z-direction based on the scaling factor of the first template image 52 of the eyes 5a with the highest degree of matching. In step C7, after determining the coordinates of the pupil positions in the captured image 51 in the same or similar manner to step B5, the detector 15 corrects the pupil position coordinates based on the estimated position of the user 13 in z-direction, and ends the template matching process. The coordinate information about the corrected pupil positions is output from the detection device 50 to the 3D projector 12. Another example second process is the same as the first process described above, except that the processing in steps B11 to B14 in FIG. 7B is the same as the processing in steps C1 to C4 in FIG. 8 and that the processing in steps C5 to C7 uses the second template image 53 of the face 5 instead of the first template image 52 of the eyes 5a, and will not be described repeatedly.

Figure 9:
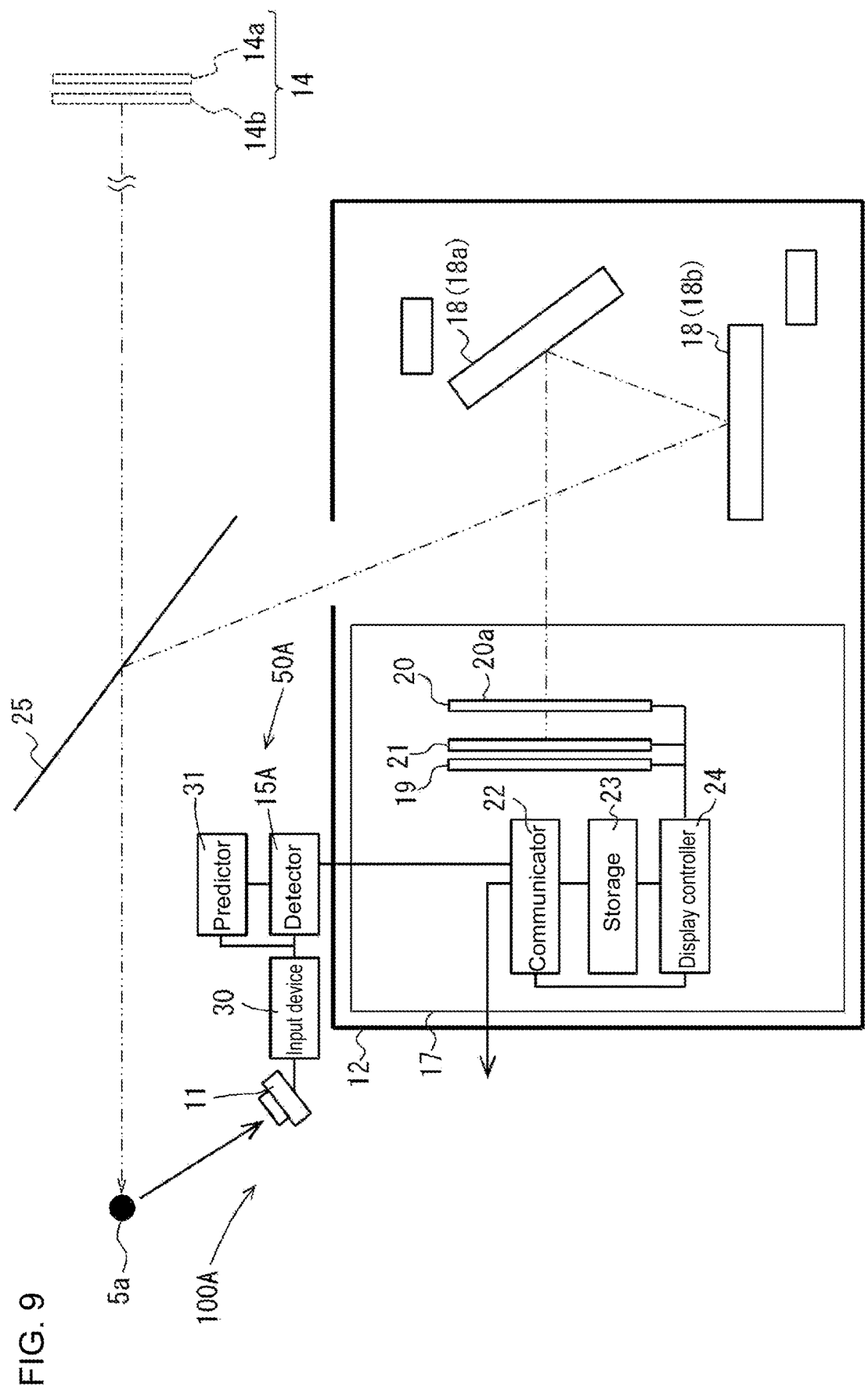
FIG. 9 is a schematic diagram of another example 3D projection system.

A 3D projection system 100A in another example will be described. In the 3D projection system 100A, as illustrated in FIG. 9, a detection device 50A includes an input device 30, a predictor 31, and a detector 15A. The components of the 3D projection system 100A are the same as or similar to the components of the 3D projection system 100 described above except the detection device 50A. The components of the 3D projection system 100A are thus denoted with the same reference numerals as the corresponding components and will not be described in detail. The predictor 31 predicts the positions of the eyes 5a at a time later than the current time based on multiple positions of the eyes 5a detected by the detector 15A at times before the current time in the first process. The positions of the eyes 5a in the present embodiment may also be coordinate information indicating the pupil positions of the eyes 5a of the user 13 as described above. The multiple positions of the eyes 5a include the positions of the eyes 5a at different detection times. The predictor 31 may predict future positions of the eyes 5a using multiple sets of data about detection time and coordinate information as data for prediction, and output the future positions as predicted positions. When detecting the positions of the eyes 5a, the detector 15A may store coordinate information and detection time as data for prediction into, for example, the storage area in the detector 15A, the storage area in the predictor 31, or the storage 23 sequentially. The future positions of the eyes 5a refer to the positions in the future with respect to the multiple sets of data stored for prediction.

The predictor 31 predicts the position of the face 5 at a time later than the current time based on multiple positions of the face 5 detected by the detector 15A at times before the current time in the second process. The position of the face 5 in the present embodiment may also be coordinate information indicating the pupil positions of the eyes 5a of the user 13 as described above. The multiple positions of the face 5 include the positions of the face 5 at different detection times. The predictor 31 may predict a future position of the face 5 using multiple sets of data about detection time and coordinate information as data for prediction, and output the future position as a predicted position. When detecting the position of the face the detector 15A may store coordinate information and detection time as data for prediction into, for example, the storage area in the detector 15A, the storage area in the predictor 31, or the storage 23 sequentially. The future position of the face 5 refers to the position in the future with respect to the multiple sets of data stored for prediction.

The method of predicting the positions of the eyes 5a and the face 5 used by the predictor 31 may use, for example, a prediction function. The prediction function is derived from multiple sets of data stored for prediction. The prediction function uses a function formula with coefficients determined in advance by experiment or other means. The prediction function may be stored in the storage area in the detector 15A, the storage area in the predictor 31, or the storage 23. The prediction function may be updated every time when the predictor 31 predicts the positions of the eyes 5a and the face 5.

The predictor 31 inputs the future time to be predicted into the prediction function and outputs the coordinate information about the positions of the eyes 5a and the face 5 (predicted positions) at the time. The future time to be predicted is the time at which the next template matching is to be performed. This may be, for example, the time when the next frame is input from the camera 11. As described above, the detector 15A may search a part of the captured image 51 as a search range in template matching. The detector 15A may search an area including the positions of the eyes 5a predicted by the predictor 31 defined as a search range in template matching in the first process. The detector 15A may search an area including the positions of the face 5 predicted by the predictor 31 defined as a search range in template matching in the second process. The detector 15A defines an area including the predicted positions output by the predictor 31 as a prediction area in the captured image 51, and defines the prediction area as a search range in template matching. The prediction area including the predicted positions may be smaller than the captured image 51 and larger than the first and second template images 52 and 53, and may contain the predicted positions within the area. For example, the prediction area may be an area in which the center coordinates of the prediction area match the coordinates of the predicted positions. The shape and size of the search range in template matching in the present embodiment may have, for example, similarity to the first and second template images 52 and 53.

The detector 15A performs template matching in such a prediction area as the search range. The template matching in the present embodiment is the same as or similar to the template matching described above except the search range. In the template matching, positions with the highest degree of matching with the first and second template images 52 and 53 are searched in the prediction area as the search range. Detection results obtained from the first process and the second process may be coordinate information indicating the pupil positions of the eyes 5a of the user 13. The prediction area as the search range in the present embodiment includes the predicted positions output from the predictor 31. The eyes 5a and the face 5 are thus highly likely to be included in the search range after the search range is set smaller. With the smaller search range, the template matching involves less computation. With such less computation, the detector 15A can output a detection result from template matching at a higher computation speed.

The predictor 31 may further calculate the change rate of the positions of the eyes based on the multiple positions of the eyes 5a detected by the detector 15A at times before the current time. As described above, sets of coordinate information and detection time are stored as prediction data. Multiple sets of prediction data are used to calculate the change rate of the positions of the eyes 5a. For example, the moving distance of the positions of the eyes can be calculated based on the difference between two sets of prediction data using the coordinate information. The time can be calculated from the detection time. The predictor 31 can thus calculate the change rate of the positions of the eyes 5a. The components in x- and y-directions can be calculated based on the moving distance and the change rate of the positions of the eyes 5a.

The detector 15A adjusts the size of the search range in template matching in the first process in accordance with the change rate calculated by the predictor 31. When the change rate calculated by the predictor 31 is large, the moving distance of the positions of the eyes 5a can be predicted to be large. When, for example, the component of the calculated change rate in x-direction is compared with the component of the calculated change rate in y-direction, the moving distance of the positions of the eyes 5a is estimated to be larger in the direction of the larger component of the change rate. In the present embodiment, the search range in template matching can be defined as a small area by predicting the positions of the eyes 5a. However, in the direction in which the component of the change rate is large, the positions of the eyes 5a may deviate from the predicted positions, and fall outside the search range. To prevent the positions of the eyes 5a from being outside the search range, for example, the detector 15A may widen the prediction area including the predicted positions in the direction of a larger component of the change rate. The detector 15A performs template matching in this widened area as the search range. The detector 15A may adjust the size of the search range in template matching of the face 5 in the second process in accordance with the change rate calculated by the predictor 31 in the same or similar manner as described above.

Figure 10:
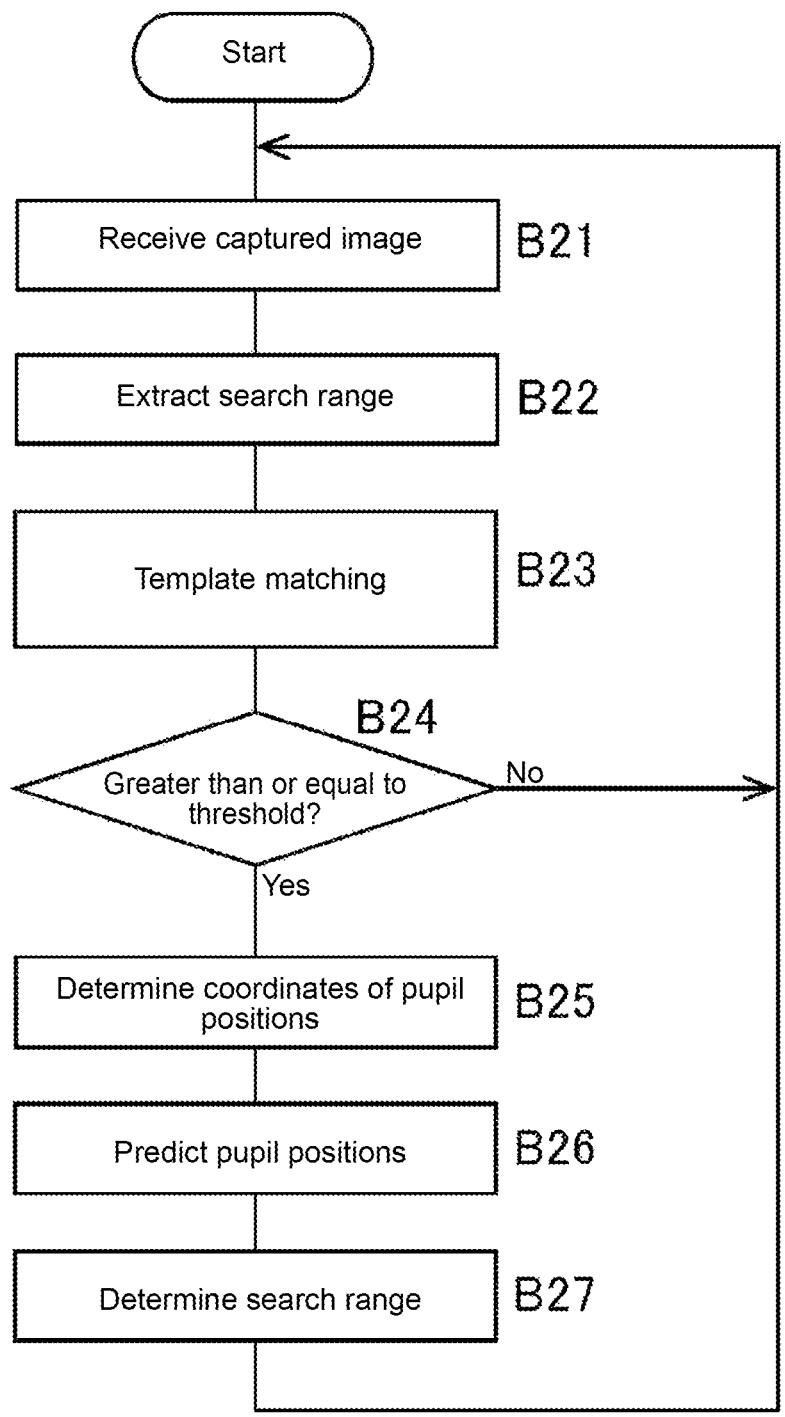
FIG. 10 is a flowchart of other example template matching of the first process.

The template matching process including pupil position prediction will be described with reference to a flowchart. The detection device 50A may perform, for example, the template matching process in the flowchart of FIG. 10 in the first process. The detection device 50A may perform, for example, the template image generation process in response to activation of the 3D projection system 100A, and start the template matching process after the template image generation process ends. The use of the first template image 52 of the eyes 5a prestored in the storage 23 may eliminate the template image generation process. The detection device 50A may thus start the template matching process in response to activation of the 3D projection system 100A.

In step B21, the input device 30 receives input of the captured image 51 captured with the camera 11. In step B22, the detector 15A extracts the search range from the captured image 51. The search range extracted in step B22 is the search range determined in step B27 (described later). In step B22, when the processing in step B27 is yet to be performed and the search range is not predetermined, the search range may be an area surrounding the position at which the first template image 52 of the eyes 5a is extracted in the template image generation process. In step B23, the detector 15A performs template matching in the search range using the first template image 52 of the eyes 5a. The detector 15A determines a position with the highest degree of matching with the first template image 52 of the eyes 5a within the search range and the degree of matching by template matching. In step B24, the detector 15A determines whether the determined degree of matching is greater than or equal to the threshold. When the value is greater than or equal to the threshold, the processing advances to step B25. When the value is less than the threshold, the processing returns to step B21. In step B25, the detector 15A determines the coordinates of the pupil positions in the captured image 51 based on the coordinates of the position with the highest degree of matching with the first template image 52 of the eyes 5a within the search range and the predefined relative coordinate positional relationship.

In step B26, the predictor 31 predicts future pupil positions and outputs the positions as predicted positions. The predictor 31 updates the prediction function based on, for example, the latest data for prediction, which is a set of coordinate information about the pupil positions determined in step B25 and the detection time, and the past data stored for prediction. The predictor 31 predicts the pupil positions using the updated prediction function and outputs the predicted positions. In step B27, the detector 15A determines the area including the predicted positions output from the predictor 31 as the search range. The processing returns to step B21. In the second process, the second template image 53 of the face 5 may be used instead of the first template image 52 of the eyes 5a in a part of the first process.

As described above, the face 5 of the user 13 may move back and forth. When, for example, the user 13 tilts the head, the face 5 of the user 13 may tilt. As the face 5 of the user 13 moves back and forth, the face 5 of the user 13 in the captured image 51 appears larger or smaller, similarly to when the image is processed for enlargement or reduction. When the face of the user 13 is tilted, the face 5 of the user 13 in the captured image is similar to when the image is processed for rotation. After the predictor 31 predicts the pupil positions in the first process, the detector 15A compares the predicted positions with the latest pupil positions. When the comparison result indicates that, for example, the interocular distance has changed, the detector 15A updates the first template image 52 of the eyes 5a to a first template image 52 of the eyes 5a with a scaling factor corresponding to the interocular distance. The detector 15A may pre-generate, for example, multiple first template images 52 with different enlargement factors and multiple first template images 52 with different reduction factors through the scaling process, and select a first template image 52 of the eyes 5a corresponding to the interocular distance as the first template image 52 of the eyes 5a. With the predictor 31 predicting the pupil position of the left eye and the pupil position of the right eye, the detector 15A may detect the change in the interocular distance by comparing the latest pupil position of the left eye and the latest pupil position of the right eye. When the interocular distance has changed as well in the second process, the detector 15A updates the second template image 53 of the face 5 to a second template image 53 of the face 5 with a scaling factor corresponding to the interocular distance. The detector 15A may pre-generate, for example, multiple second template images 53 with different enlargement factors and multiple second template images 53 with different reduction factors through the scaling process, and select a second template image 53 of the face 5 corresponding to the interocular distance as the second template image 53 of the face 5.

In the first process, the detector 15A compares the predicted positions with the latest pupil positions. When the comparison result indicates that the pupil positions have changed in accordance with the tilted face, the detector 15A updates the first template image 52 of the eyes 5a to a first template image 52 of the eyes 5a with a rotation angle corresponding to the tilt change. The detector 15A may pre-generate, for example, multiple first template images 52 with different rotation angles through the rotation process, and select a first template image 52 corresponding to the tilt change as the first template image 52 of the eyes 5a. With the predictor 31 predicting the pupil position of the left eye and the pupil position of the right eye, the detector 15A may detect the tilt change based on the change in the position in y-direction by comparing the latest pupil position of the left eye and the latest pupil position of the right eye. When the face of the user 13 is tilted, the respective pupil positions in y-direction (y-coordinates) of the left and right eyes change in different directions. For example, the pupil position in y-direction of the left eye changing upward and the pupil position in y-direction of the right eye changing downward correspond to a tilt change. The detector 15A may calculate the rotation angle based on the magnitude of the position change of the left and right eyes in y-direction. When the pupil positions are tilted as well in the second process, the detector 15A updates the second template image 53 of the face to a second template image 53 with a rotation angle corresponding to the tilt change. The detector 15A may pre-generate, for example, multiple second template images 53 with different rotation angles through the rotation process, and select a second template image 53 corresponding to the tilt change as the second template image 53 of the face 5.

Figure 11:
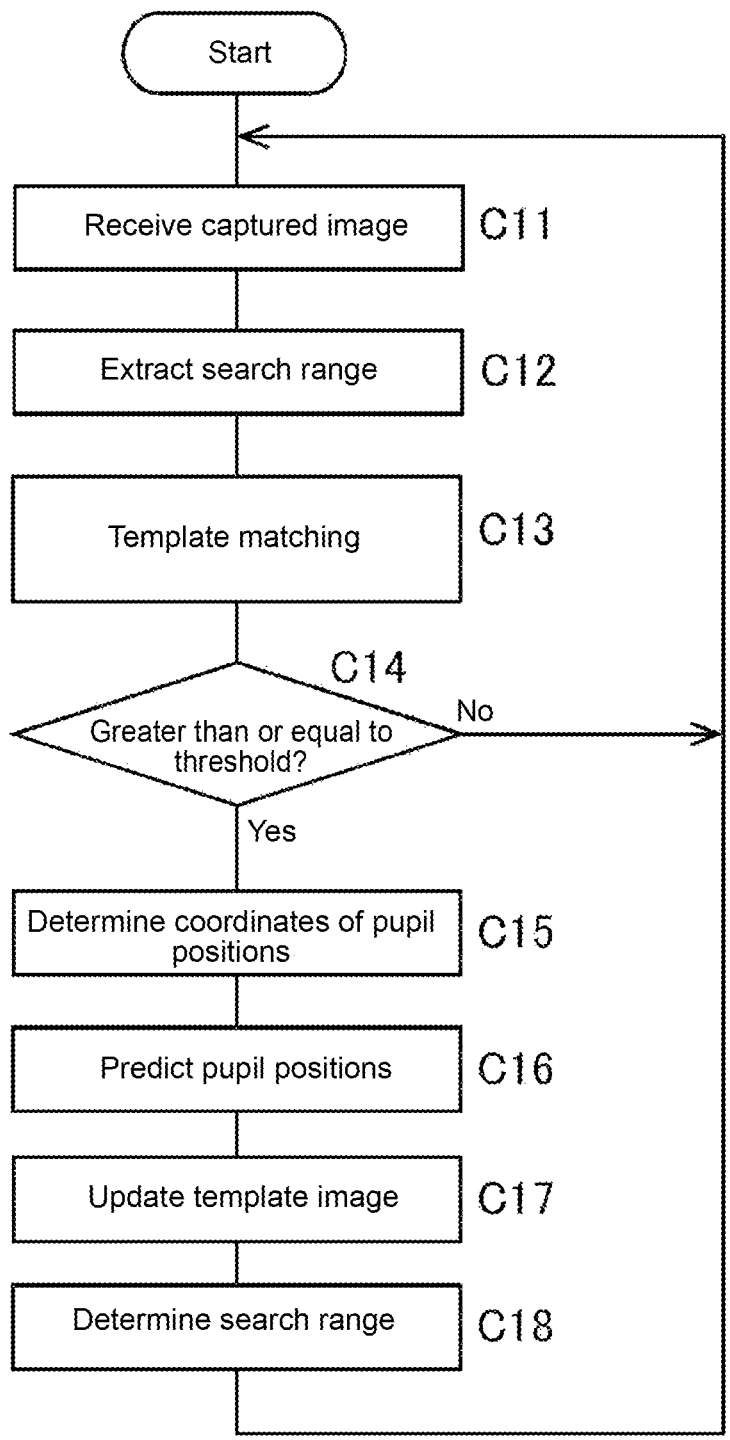
FIG. 11 is a flowchart of other example template matching of the first process.

The template matching process including updating the template image will be described with reference to a flowchart. The detection device 50A may perform, for example, the template matching process in the flowchart of FIG. 11 in the first process. In step C11, the input device 30 receives input of the captured image 51 captured with the camera 11. In step C12, the detector 15A extracts the search range from the captured image 51. The search range extracted in step C12 is the search range determined in step C18 (described later). In step C12, when the processing in step C18 is yet to be performed and the search range is not predetermined, the search range may be an area surrounding the position at which the first template image 52 of the eyes 5*a* is extracted in the template image generation process. In step C13, the detector 15A performs template matching in the search range using the updated first template image 52 of the eyes 5*a*. The first template image 52 of the eyes 5*a* is the first template image 52 of the eyes 5*a* updated in step C17 (described later). The detector 15A determines a position with the highest degree of matching with the first template image 52 of the eyes 5*a* within the search range and the degree of matching by template matching. In step C14, the detector 15A determines whether the determined degree of matching is greater than or equal to the threshold. When the value is greater than or equal to the threshold, the processing advances to step C15. When the value is less than the threshold, the processing returns to step C11. In step C15, the detector 15A determines the coordinates of the pupil positions in the captured image 51 based on the coordinates of the position with the highest degree of matching with the first template image 52 of the eyes 5*a* within the search range and the predefined coordinate positional relationship.

In step C16, the predictor 31 predicts future pupil positions and outputs the position as predicted positions. In step C17, the detector 15A updates the first template image 52 of the eyes 5*a*. The detector 15A compares the predicted positions with the latest pupil positions and updates the first template image 52 to a first template image 52 of the eyes 5*a* that has at least undergone the scaling process or the rotation process in accordance with the comparison result. In step C18, the detector 15A determines the area including the predicted positions output from the predictor 31 as the search range. The processing returns to step C11. In the second process, the second template image 53 of the face 5 may be used instead of the first template image 52 of the eyes 5*a* in a part of the first process.

When performed with the first positions, the second positions, and the third positions all resulting from erroneous detection, the fifth process may have low prediction accuracy and obtain largely deviating predicted positions. With the first positions, the second positions, and the third positions all resulting from erroneous detection, the detector 15 or 15A may determine an area including the fourth positions instead of the predicted positions as the search range in steps B27 and C18.

The structure according to the present disclosure is not limited to the structure described in the above embodiments, but may be changed or varied variously. For example, the functions of the components are reconfigurable unless any contradiction arises. Multiple components may be combined into a single unit, or a single component may be divided into separate units.

The figures illustrating the configurations according to the present disclosure are schematic. The figures are not drawn to scale relative to the actual size of each component.

In the present disclosure, the first, the second, the third, or others are identifiers for distinguishing the components. The identifiers of the components distinguished with the first, the second, the third, and others in the present disclosure are interchangeable. For example, the first process can be interchangeable with the second process. The identifiers are to be interchanged together. The components for which the identifiers are interchanged are also to be distinguished from one another. The identifiers may be eliminated. The components without such identifiers can be distinguished with reference numerals. The identifiers such as the first and the second in the present disclosure alone should not be used to determine the order of components or to suggest the existence of smaller number identifiers.

In the present disclosure, x-axis, y-axis, and z-axis are used for ease of explanation and may be interchangeable with one another. The orthogonal coordinate system including x-axis, y-axis, and z-axis is used to describe the structures according to the present disclosure. The positional relationship between the components in the present disclosure is not limited to being orthogonal.

REFERENCE SIGNS 5 face
5*a* eye (5*a*L: left eye, 5*a*R: right eye)
10 movable body
11 camera
12 3D projector
13 user
14 virtual image (14*a*: first virtual image, 14*b*: second virtual image)
15, 15A detector
16 eye box
17 3D display device
18 optical element (18*a*: first mirror, 18*b*: second mirror)
19 backlight
20 display (20*a*: display surface)
201L left-eye viewing area
201R right-eye viewing area
21 barrier (21*a*: light-blocking portion, 21*b*: open portion)
22 communicator
23 storage
24 display controller
25 windshield
30 input device
31 predictor
50, 50A detection device
51 captured image
52 first template image of eyes
53 second template image of face
100, 100A 3D projection system (image display system)

The invention claimed is:

1. A detection device, comprising:
an input device configured to receive input of image information;
a controller configured to perform a detection process to detect current positions of eyes of a user; and
a predictor configured to predict future positions of the eyes of the user,
wherein the controller performs, as the detection process,
a first process to detect first positions of the eyes of the user based on the input image information by template matching using a first template image,
a second process to detect a position of a face of the user based on the input image information by template matching using a second template image different from the first template image and detect second positions of the eyes of the user based on the detected position of the face of the user, and
a third process to detect third positions of the eyes of the user based on the input image information, the third process being different from the first process,
wherein the predictor predicts, based on the third positions of the eyes of the user, the future positions of the eyes of the user.

2. The detection device according to claim 1, wherein the controller further performs, as part of the detection process, a fourth process to detect fourth positions of the eyes based on the first positions and the second positions.

3. The detection device according to claim 1, wherein the third positions are stored in a storage area in the controller.

4. The detection device according to claim 1, wherein the controller performs more accurate detection in the third process than in the first process.

5. The detection device according to claim 1, wherein the controller performs the third process periodically.

6. The detection device according to claim 1, wherein the controller performs the third process in parallel with the first process.

7. The detection device according to claim 2, wherein the controller performs a fifth process to compare the third positions with the first positions, the second positions, or the fourth positions.

8. The detection device according to claim 7, wherein the controller performs, based on a result from the fifth process, template matching in a search range being an area including the third positions in at least one of the first process or the second process.

9. An image display system, comprising:
  a display configured to display a parallax image projected toward two eyes of a user through an optical system;
  a barrier configured to define a traveling direction of image light of the parallax image to generate parallax between the two eyes;
  a camera configured to capture an image of a face of the user;
  an input device configured to receive input of image information output from the camera;
  a detector configured to perform a detection process to detect positions of the two eyes of the user;
  a predictor configured to predict future positions of the two eyes of the user; and
  a display controller configured to generate a parallax image corresponding to the positions of the two eyes of the user detected by the detector and to control the display,
  wherein the detector performs, as the detection process, a first process to detect first positions of the two eyes of the user based on the input image information by template matching using a first template image,
  a second process to detect a position of a face of the user based on the input image information by template matching using a second template image different from the first template image and detect second positions of the two eyes of the user based on the detected position of the face of the user, and
  a third process to detect third positions of the two eyes of the user based on the input image information, the third process being different from the first process,
  wherein the predictor predicts, based on the third positions of the two eyes of the user, the future positions of the two eyes of the user.

10. The image display system according to claim 9, wherein the detector performs, as part of the detection process, a fourth process to detect fourth positions of the two eyes of the user based on the first positions and the second positions, and the display controller generates the parallax image based on the first positions, the second positions, the third positions, or the fourth positions.

* * * * *